Jan. 6, 1953 H. W. ROCKWELL 2,624,131
BULLDOZER WITH PUSH FRAME STABILIZER MECHANISM
Filed March 3, 1948 6 Sheets-Sheet 5

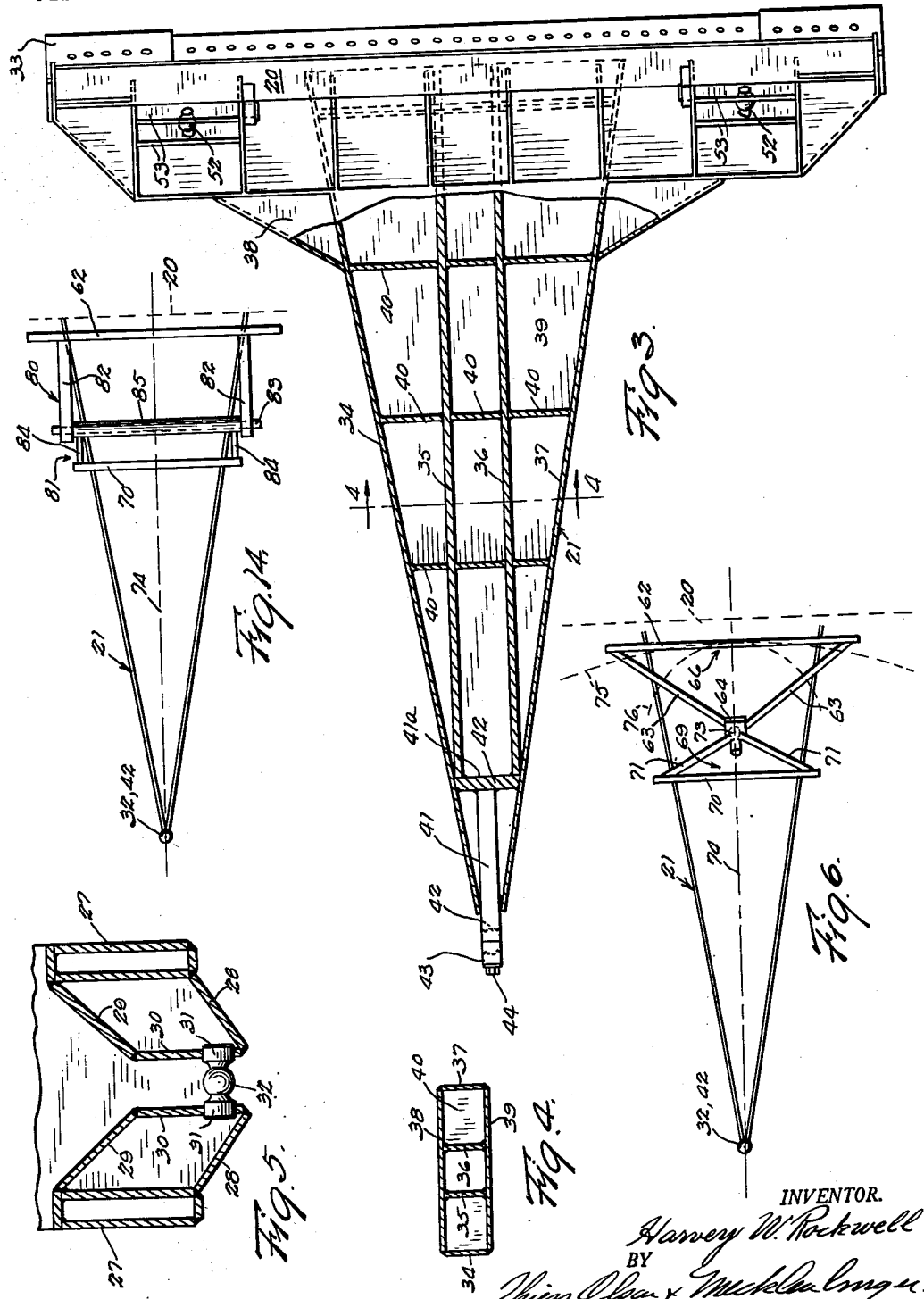

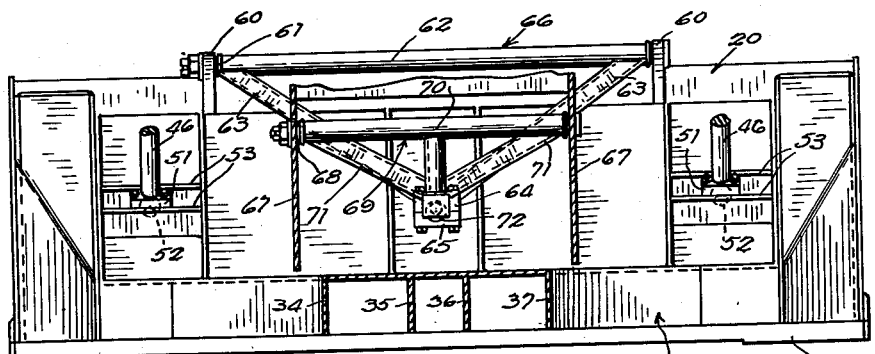
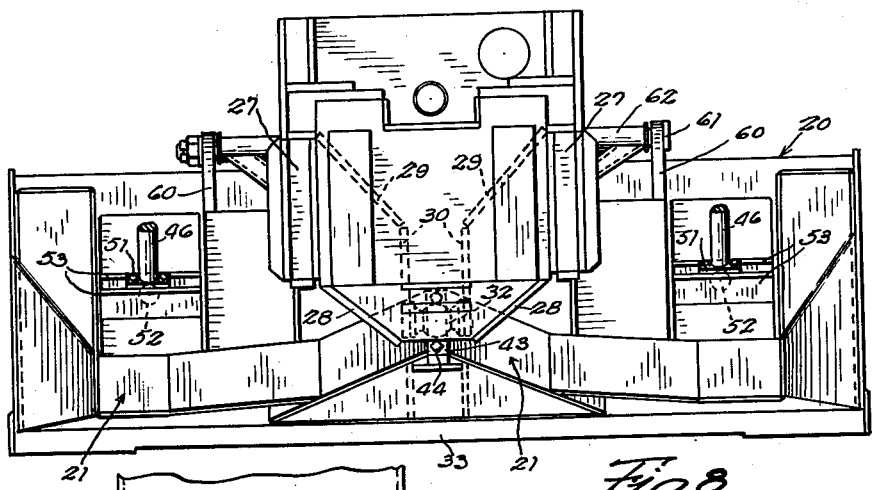
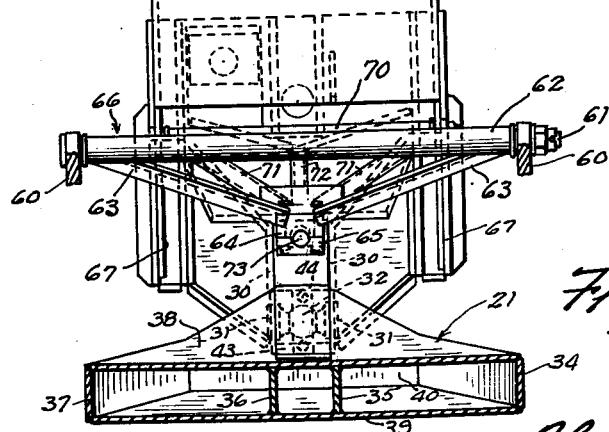

INVENTOR.
Harvey W. Rockwell
BY

Jan. 6, 1953 H. W. ROCKWELL 2,624,131
BULLDOZER WITH PUSH FRAME STABILIZER MECHANISM
Filed March 3, 1948 6 Sheets-Sheet 6

INVENTOR.
Harvey W. Rockwell
BY
Thiess, Olson & Mecklenburger
Attys.

Patented Jan. 6, 1953

2,624,131

UNITED STATES PATENT OFFICE 2,624,131

BULLDOZER WITH PUSH FRAME STABILIZER MECHANISM

Harvey W. Rockwell, Cedar Rapids, Iowa, assignor, by mesne assignments, to Allis-Chalmers Manufacturing Company, a corporation of Delaware Application March 3, 1948, Serial No. 12,740

8 Claims. (Cl. 37—144)

This invention relates to earthmovers; more particularly to implement supports and operators for vehicles such as tractors; and the invention has for an object the provision of improved apparatus of this character.

In the past, various types of tractor or vehicle attachments comprising earth-moving or earth-working implements or tools have been provided, adapted to be raised, lowered, and otherwise adjusted by suitable power means capable of being operated from the driver's station on the vehicle or tractor. One commonly used tool or implement in equipment of this character constitutes a bulldozer or trailbuilder blade supported on a suitable push frame, the push arms of which are pivotally connected to opposite sides of the tractor. Bulldozers, for example, have heretofore been constructed wherein the connections of the push arms to the tractor and the arrangement of the power operating means have been such as to provide for selective raising and lowering of the blade, and in some cases for tilting of the blade all under the control of the tractor operator, and it is to earthmovers or bulldozers of this latter type that the invention particularly relates.

It is a further object of the invention to provide an improved implement support for attachment to a tractor, which is of simple but rugged construction, and which insures reliable and trouble-free operation.

Another object of the invention is to provide equipment of this character in which the blade or implement may be readily adjusted to a variety of raised and lowered positions.

Another object of the invention is to provide equipment of this character in which the blade or implement may be readily adjusted to a variety of raised, lowered, and tilted positions.

Another object of the invention is to provide improved mounting and stabilizing means for preventing lateral movement of the blade or implement while permitting selective movement of the blade under the control of the operator.

Still another object of the invention is to provide simple and inexpensive stabilizing means for preventing lateral movement of the blade or implement while permitting raising, lowering, and tilting thereof as desired.

In carrying out the invention in one form, a tractor having a main frame is provided with a push frame which extends longitudinally of the tractor beneath the main frame, the rear end of the push frame being supported from the tractor frame by supporting means which provide for both lateral and longitudinal tilting of the push frame relative to the main tractor frame. An implement or blade disposed forwardly of the tractor is mounted on the forward end of the push frame, and power means are provided operatively engaging the implement for selectively raising and lowering the implement and for tilting the implement laterally. More particularly, the power means comprises a pair of hydraulic jacks mounted in lateral spaced relation on the tractor and operatively engaging the implement, the hydraulic jacks being individually operable to control the movements of the implement or blade and the respective connections of the jacks to the tractor and to the blade being of a character to permit universal movement thereof. In addition, stabilizing means are provided, connected between a forward portion of the tractor and the implement for preventing sidewise movement of the blade or implement while permitting selective raising, lowering, and tilting thereof. Alternatively, the stabilizing means may be arranged to prevent tilting as well as sidewise movement of the blade where such tilting is considered undesirable.

For a more complete understanding of the invention, reference should now be had to the drawings, in which Fig. 1 is a side-elevational, partially phantom view of a tractor-mounted bulldozer, the tractor being largely shown in broken lines, and only so much of the tractor frame as is necessary for an understanding of the present invention being shown in full lines;

Fig. 3 is a top plan view of the bulldozer blade and the push frame therefor, a portion of the push frame being broken away more clearly to illustrate the construction thereof;

Fig. 4 is a detailed sectional view taken along the line 4—4 of Fig. 3;

Fig. 5 is a fragmentary sectional view taken along the line 5—5 of Fig. 2;

Fig. 6 is a somewhat diagrammatic representation of the bulldozer blade and push frame and the stabilizing means therefor, illustrating the manner in which the stabilizing means prevents sidewise movement of the blade or implement;

Fig. 7 is a vertical sectional view taken substantially along the line 7—7 of Fig. 1;

Fig. 8 is a similar view taken along the line 8—8 of Fig. 1, but showing the blade in a lowered ground-engaging position;

Fig. 9 is a sectional view taken along the line 9—9 of Fig. 1, the blade again being lowered as in Fig. 8;

Fig. 14 is a diagrammatic representation, similar to Fig. 6, but illustrating another embodiment of the invention, wherein the stabilizing means prevents tilting as well as sidewise movement of the blade or implement.

Figure 1:
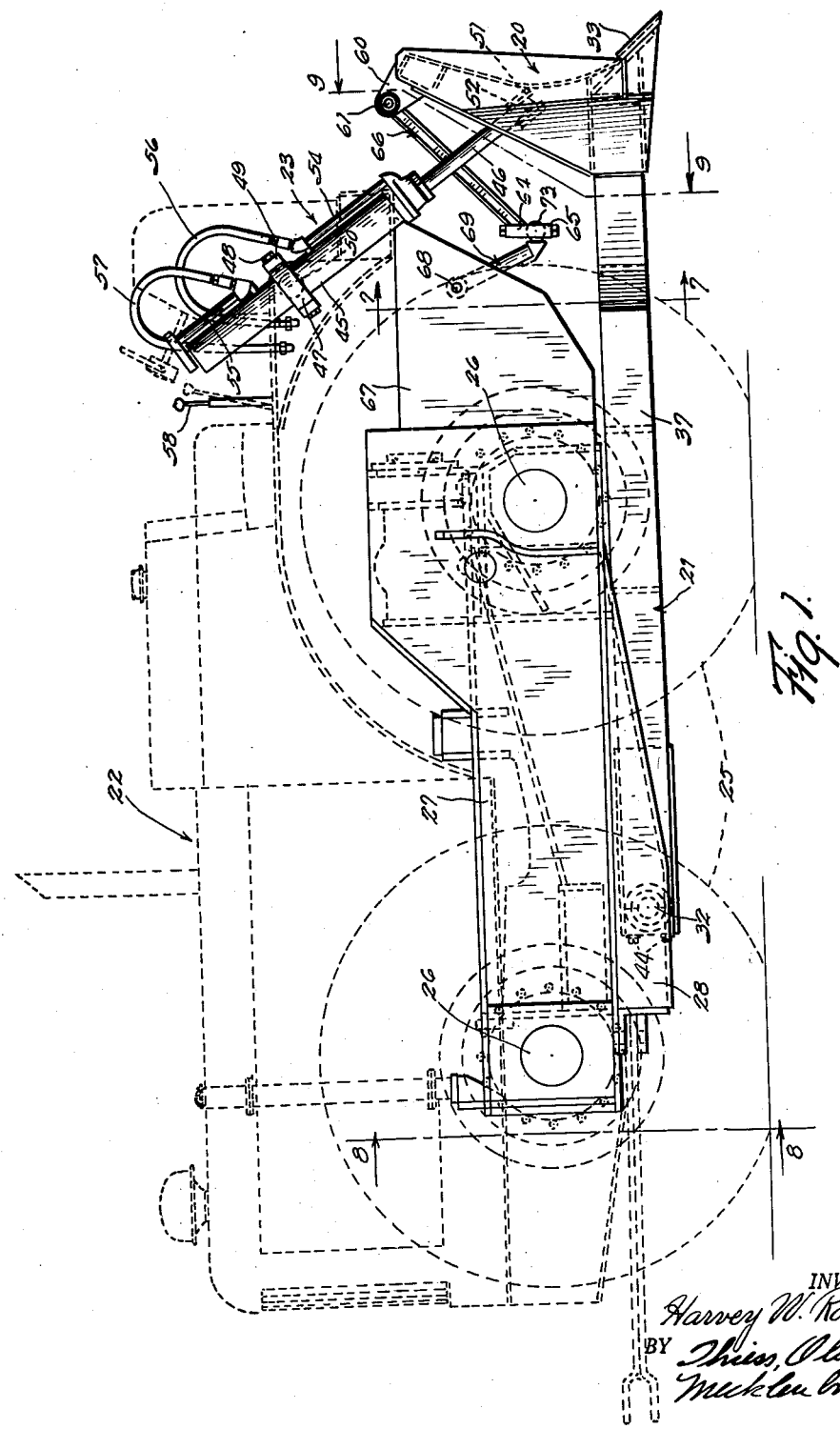

Referring now to the drawings, the invention is shown as embodied in an earthmover of the bulldozer type comprising a bulldozer attachment which includes a blade or implement 20 carried on a push frame 21 which is adapted to be suitably mounted on a tractor 22 for operation by a pair of hydraulic jacks 23 and 24. Although any conventional type of tractor or vehicle may be employed, there is shown for purposes of illustration a wheel-type tractor having four rubber-tired wheels 25 mounted on suitable axles 26 carried by the tractor frame. As previously indicated, only so much of the tractor as is necessary to an understanding of the invention is shown in full lines, the remaining portions being shown in dot-and-dash lines in order more clearly to illustrate the interrelation of the tractor frame and the bulldozer attachment.

The main frame of the tractor is shown as comprising a pair of side beams 27, which may be of any suitable construction but which are illustrated, as shown best in Fig. 5, as comprising hollow, box-like structures built up from a plurality of steel plates suitably welded together. These side beams 27 of the main tractor frame which support the axles 26 are spaced apart and connected by suitable cross members and braces, as shown best in Fig. 2. Adjacent the rear end of the tractor frame a supporting structure comprising a plurality of downwardly extending plates 28 and 29 is secured to the side beams 27, the plates 28 and 29 being connected by suitable vertically-extending plates 30 which are spaced apart, as shown in Fig. 5, and which support a suitable bearing member having end portions 31, which are welded or otherwise secured to the plates 30, and having a ball-like portion 32 in the space intermediate the plates 30. The supporting structure just described constitutes the sole support for the rear end of the push frame 21 and, as shown, is located rearwardly of the tractor frame and substantially on the longitudinal center line thereof.

The bulldozer attachment, comprising the blade 20 and the push frame 21, may be of any suitable construction, but is shown as comprising a blade structure which is of conventional box-like form built up from suitable steel plates welded together and carrying a cutting blade 33, the box-like blade structure being mounted on the forward end of the push frame 21 which, as shown best in Fig. 3, is substantially triangular in form and comprises a plurality of longitudinally extending plates 34, 35, 36, and 37 which are connected together by suitable top and bottom plates 38 and 39 and by suitable cross braces 40. At the rear end of the push frame 21, which constitutes the apex of the triangular structure opposite from the blade 20, is a rearwardly extending bar 41 suitably secured, as by welding, to a cross member 41a and to the side members 34 and 37, the extending end of this bar 41 being formed to provide one-half of a socket 42 of substantially spherical configuration. Associated with the outer end of the bar is a cap member 43 adapted to be secured to the bar 41 by suitable bolts 44, the cap 43 being formed, as shown (Fig. 3), to form the other half of the spherical socket 42.

Figure 2:
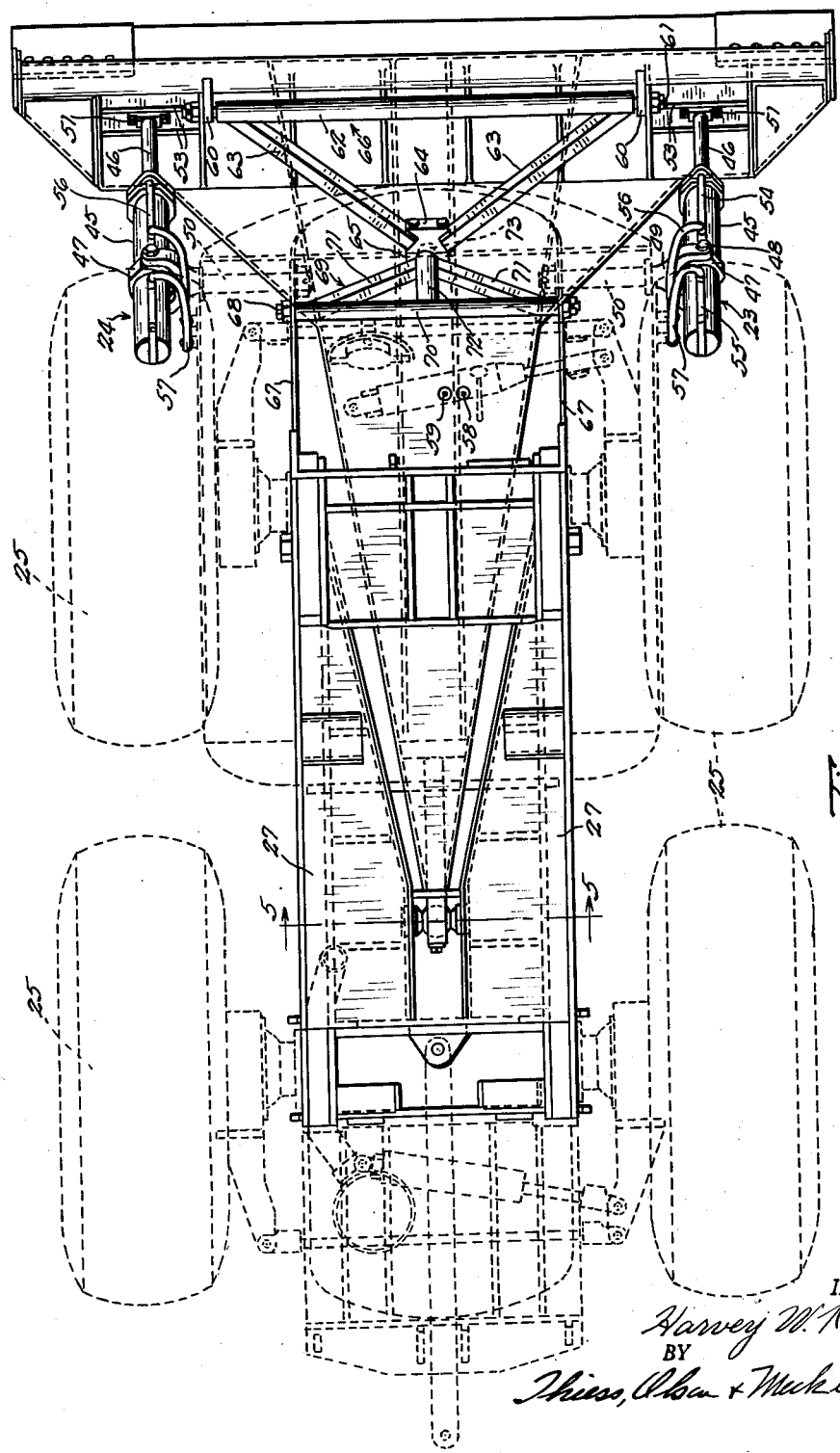
Fig. 2 is a top plan view of the equipment shown in Fig. 1, and is similar to Fig. 1 with respect to the partially phantom showing of the tractor.

As shown best in Fig. 2, the socket 42 is adapted to receive the ball-like portion 32 so as to support the push frame 21 beneath the main frame of the tractor and to provide a ball-and-socket connection which permits limited, substantially universal movement of the push frame relative to the tractor frame. As will be apparent, the ball-and-socket connection permits the push frame 21 to rotate about the longitudinal center line of the tractor so as to effect lateral tilting of the blade 20, it permits rotation of the push frame about the transverse axis of the bearing member formed by the end members 31 and the ball 32 so as to effect raising and lowering of the blade 20, and in addition it permits rotation of the push frame 21 about a vertical axis through the ball member 32 which would effect sidewise movement of the blade relative to the tractor frame.

In order to provide for proper operation and control of the bulldozer attachment by the driver of the tractor, the hydraulic jacks 23 and 24 are mounted on opposite sides of the tractor adjacent the front thereof, each of the jacks being of the double-acting type and comprising a cylinder 45 for receiving a suitable piston, not shown, which carries the piston rod 46 extending from one end of the cylinder 45. Proper operation of the bulldozer attachment by the hydraulic jacks 23 and 24 is facilitated by providing a universal mounting for each of the jacks on the tractor, which mounting consists of a ring member 47 secured to the cylinder 45, which ring member is adapted to rotate on an axis provided by a supporting pin 48 carried on a yoke 49, the yoke being mounted on a longitudinally extending pin 50 rotatably supported on the tractor. Likewise a universal connection is provided between the outer end of each piston rod 46 and the bulldozer blade, this universal connection being provided by a suitable socket 51 carried on the end of the piston rod 46 and adapted to engage a ball member 52 mounted between suitable supporting plates 53 which form a part of the bulldozer blade, as shown best in Fig. 3.

As previously indicated, each of the hydraulic jacks 23 and 24 is of the double-acting type, there being fluid connections at each end of the cylinders 45 for selectively admitting and exhausting hydraulic fluid to and from opposite ends of the piston so as to extend or withdraw the piston rod 46 relative to the cylinder 45. These hydraulic connections are shown in Figs. 1 and 2 as including suitable piping 54 and 55 adapted to be connected through suitable flexible conduits 56 and 57 to one or more sources of hydraulic pressure (not shown) and suitable valve means are provided for effecting proper operation of the hydraulic jacks.

Hydraulic systems comprising a plurality of independently operable valves for individually controlling the supply of hydraulic medium to a plurality of hydraulic jacks from one or more sources of pressure are well known in the art, and it is not deemed necessary to illustrate in detail either the pressure source or the details of the control valves further than to point out that, for convenience of operation by the driver of the tractor, the control valves are provided with individual control levers 58 and 59, which are located at the driver station within easy reach and in close proximity to each other, so that the driver may with one hand operate either or both of the hydraulic jacks 23 and 24 in either the same or opposite directions.

Figure 10:
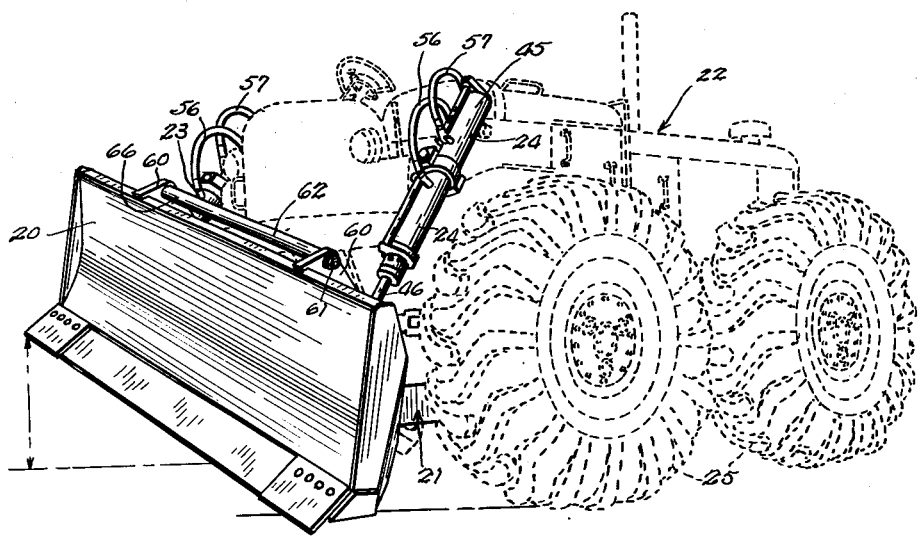
Figs. 10 and 11 are perspective views showing the bulldozer blade in oppositely tilted positions, the tractor again being shown in broken lines.
Figure 11:
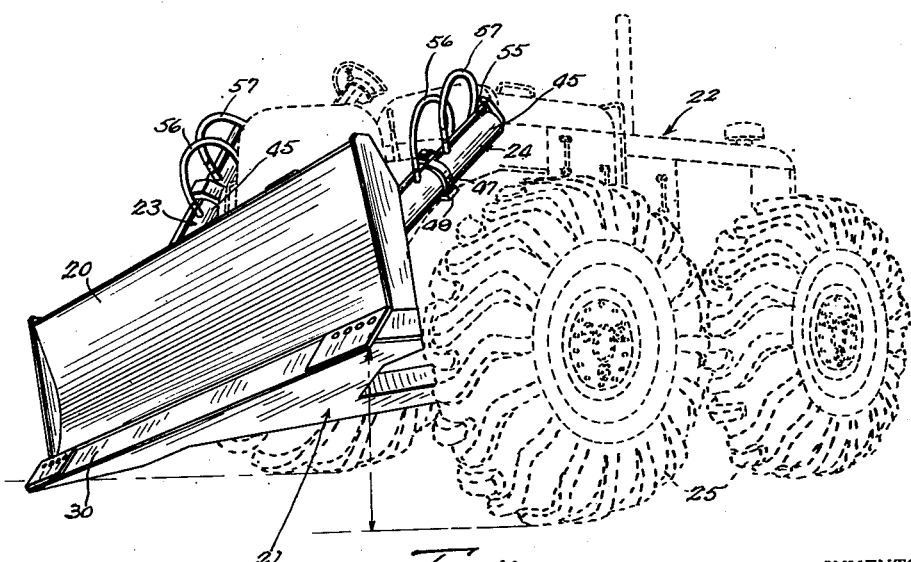
Figure 12:
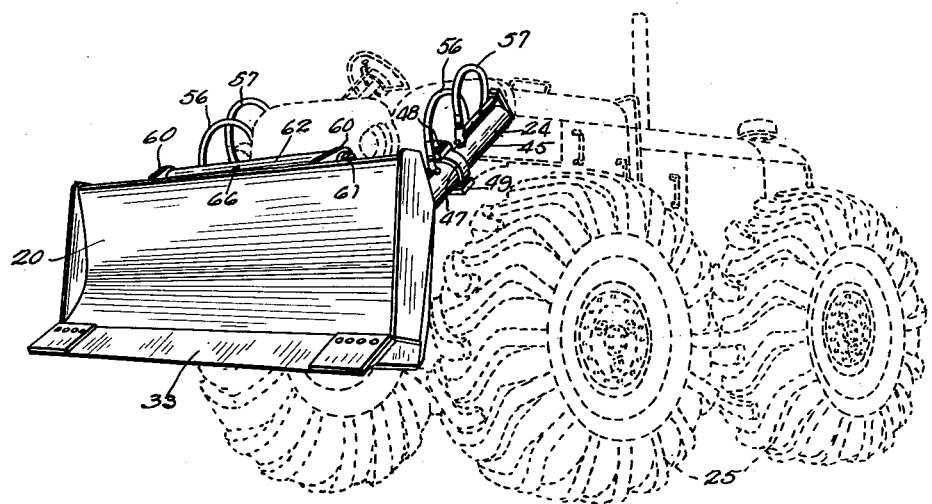
Fig. 12 is a perspective view similar to Figs. 10 and 11, but showing the blade in a raised horizontal position.
Figure 13:
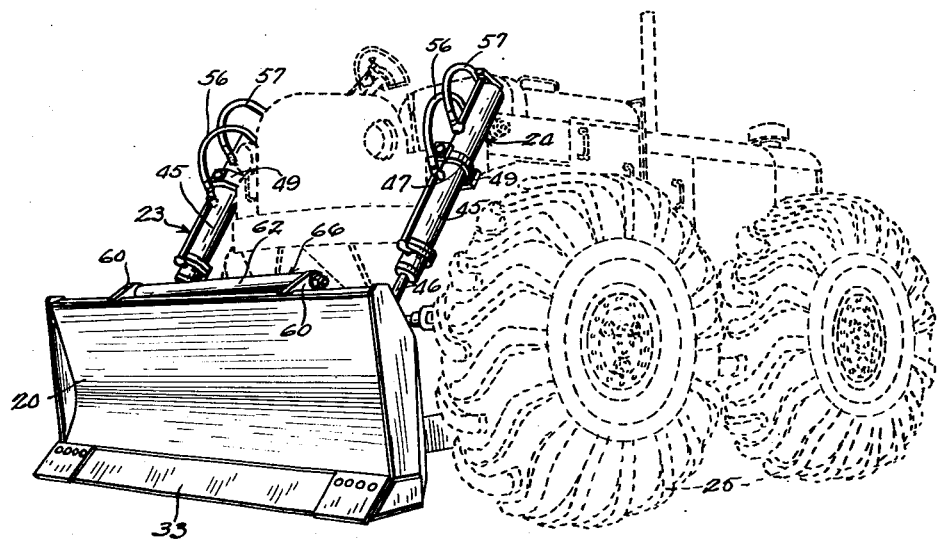
Fig. 13 is a perspective view similar to Fig. 12 with the blade in a lowered horizontal position.

If it be assumed that the bulldozer blade is in the partially raised position shown in Fig. 1, with the blade substantially horizontal, it will be apparent that the driver of the tractor, by operating both of the levers 58 and 59 to extend the jacks 23 and 24, may lower the blade 20 while maintaining it in substantially horizontal position. The respective raised and lowered positions of the horizontally extending blade are clearly shown in Figs. 12 and 13. Likewise it will be apparent that with the blade in the raised position shown in Fig. 12, the driver merely by operating the lever 59 may lower the corresponding side of the blade so as to shift the blade to the tilted position shown in Fig. 10. Similarly, individual operation of the hydraulic jack 23, by means of the lever 58, would be effective to extend the jack 23 and operate the blade 20 from the position shown in Fig. 12 to the position shown in Fig. 11. Any intermediate positions of the blade may, of course, be achieved at will and the bade may be raised and lowered either while tilted or while in substantially horizontal relation merely by proper independent or simultaneous operation of the hydraulic jacks.

Such manipulation of the blade and push frame by the hydraulic jacks is permitted by the ball-and-socket mounting at the rear end of the push frame and by the universal connections between the hydraulic jacks and the tractor and blade respectively. By reason of these universal connections, however, a condition of instability would exist which would permit the blade to swing sidewise with respect to the tractor, and this sidewise movement could not be controlled by the operator. Accordingly stabilizing means are provided which prevent sidewise movement of the blade and push frame relative to the tractor while at the same time permitting the desired raising, lowering, and tilting of the blade. This stabilizing means consists of a plurality of interconnected levers respectively pivoted on the tractor and the blade, the interconnection between the levers being such as to permit substantially universal movement of the levers with respect to each other.

As shown best in Figs. 1, 2, and 6, the blade 20 is provided adjacent its upper edge with a plurality of supporting ears 60 which support a transversely extending pivot shaft 61 on which is pivoted a lever structure comprising a hollow shaft 62 and a pair of converging arms 63, the rearward ends of which carry a socket member 64 that provides, in conjunction with a suitable cap 65, a substantially spherical socket. Thus there is provided a substantially triangular lever 66 which is pivoted to the blade for pivotal movement only about a transverse axis, but which is otherwise restrained against movement relative to the blade.

Extending from the side beams 27 of the tractor frame are a pair of supporting plates 67 which carry a suitable pivot shaft 68 on which is mounted a second triangular lever structure 69 consisting of a hollow shaft 70 mounted on the shaft 68 and carrying a pair of converging arms 71 and a central arm 72 to which the arms 71 at connected, the arm 72 terminating in a ball 73 adapted to engage within the spherical socket formed by the bearing member 64 and the cap member 65 on the triangular lever 66. Thus the second triangular lever 69 is mounted on the tractor for pivotal movement only about a transverse axis and is otherwise restrained against movement relative to the tractor.

It will thus be apparent that as the bulldozer blade is raised and lowered, the levers 66 and 69 will pivot about their respective shafts 61 and 68, and the ball-and-socket connection between the two levers will permit relative angular movement thereof so that interference with free movement of the bulldozer blade in a vertical direction is entirely avoided. Likewise when the bulldozer blade is tilted, rotation of the levers 66 and 69 about their transverse pivots, together with relative tilting movement between the levers which is permitted by the ball-and-socket connection, avoids interference with any desired tilting movement of the bulldozer blade.

On the other hand, the stabilizing mechanism is effective to prevent any sidewise movement of the blade, i. e., rotation of the push frame about a vertical axis through the ball 32, as will be apparent upon a consideration of the diagrammatic showing contained in Fig. 6. In Fig. 6 the blade 20, the push frame 21, the universal connection provided by the ball 32, and the socket 42 at the rear end of the push frame and the stabilizing mechanism are shown diagrammatically, and it will be observed that both the ball-and-socket connection at the rear end of the push frame and the ball-and-socket connection between the levers 66 and 69 are located on the center line of the tractor which is represented by a dot-and-dash line 74, and by reason of the mounting of the lever 69 on the tractor, movement of the ball 73 out of a vertical plane through this center line is prevented. Consequently two vertical pivots are provided which effectively prevent sidewise movement of the blade 20 due to the fact that the path of movement of the blade about the rear ball-and-socket connection, which is represented by the broken line 75 in Fig. 6, does not coincide with the path of movement of the blade about the ball-and-socket connection 73, which is represented by the broken line 76 in Fig. 6. It will thus be apparent that the present invention provides a bulldozer structure which incorporates a simple and rugged mounting for the bulldozer blade, which permits a high degree of flexibility in raising, lowering, and tilting the blade, as desired, under the control of the driver of the tractor, and in which the blade is positively stabilized so as to prevent undesirable sidewise movement of the blade relative to the tractor.

In some classes of work it has been found that lateral tilting is undesirable and that the blade or implement in the embodiment of the invention shown in Figs. 1 to 13, incl., may impose some difficulties of control as contrasted with a blade mounted only for raising and lowering movement. For such classes of work it may be desirable to substitute for the stabilizing means heretofore described a modified type of stabilizing means which positively prevents tilting of the blade while permitting raising and lowering thereof.

In Fig. 14 there is diagrammatically shown a stabilizing means of the latter type, in which a pair of substantially rectangular levers 80 and 81 connected by a horizontal pivot are substituted for the triangular levers 66 and 69 and the balland-socket connection therebetween. Thus the rectangular lever 80 consists of a pair of arms 82 which extend rearwardly from the hollow shaft 62 which forms the pivotal connection of the lever 80 to the blade 20, and the arms 82 support a horizontally extending pivot shaft 83. Similarly the lever 81 consists of a pair of arms 84 which extend from the hollow shaft 70 which forms the pivotal connection of the lever 81 to the tractor frame, and the arms 84 carry a hollow shaft 85 within which the pivot shaft 83 is received so as to provide a horizontal pivotal connection between the levers 80 and 81 which prevents lateral tilting of the blade 20 relative to the tractor frame while permitting raising and lowering of the blade under the control of the operator.

Since lateral tilting of the blade 20 and the push frame 21 is positively prevented by the stabilizing means in this embodiment of the invention, the ball-and-socket mounting at the rear end of the push frame may be replaced by a single horizontal pivot if desired, and the jacks 23 and 24 may be connected to the pressure source in parallel circuits for control by a single control valve.

In order to disassemble the bulldozer attachment from the tractor when it is desired to use the tractor for other purposes, it is necessary only to disconnect the ball-and-socket joint at the rear of the push frame, remove shaft 68 or alternatively disconnect the ball 73 from its socket, and either disconnect the piston rods 46 from the bulldozer blade, in which case the jacks 23 and 24 would remain on the tractor after the bulldozer attachment is removed, or remove the pins 50 and disconnect the hydraulic couplings, in which case the jacks may be removed from the tractor with the bulldozer attachment.

While a particular embodiment of the invention has been shown, it will be understood, of course, that it is not desired to be limited thereto since many modifications may be made, and it is therefore contemplated by the appended claims to cover any such modifications as fall within the true spirit and scope of the invention.

Having thus described my invention, what I claim and desire to secure by Letters Patent is:

1. The combination with a tractor having a main frame, of a push frame extending longitudinally of said tractor beneath the main frame, means disposed rearwardly of said tractor and on substantially the center line thereof providing a universal connection between said main frame and the rear end of said push frame, an implement carried forwardly of said tractor on the forward end of said push frame, means on said tractor for selectively raising, lowering and laterally tilting said implement, and stabilizing means interconnecting a forward portion of said main frame and said implement for permitting raising, lowering and tilting of said push frame while preventing sidewise movement of said implement relative to said tractor, comprising a connecting member pivotally mounted on said tractor for generally vertical movement only, a lever construction pivoted to said implement on a transverse axis for generally vertical movement only, and a universal connection between said connecting member and said lever construction intermediate the connections of said connecting member and said lever to said tractor and implement respectively, said connecting member and lever being freely movable vertically upon raising and lowering of said push frame.

2. The combination with a tractor having a main frame, of a push frame extending longitudinally of said tractor beneath the main frame, means disposed rearwardly of said tractor and on substantially the center line thereof providing a universal connection between said main frame and the rear end of said push frame, an implement carried forwardly of said tractor on the forward end of said push frame, means on said tractor for selectively raising, lowering and laterally tilting said implement, and stabilizing means interconnecting a forward portion of said main frame and said implement for permitting raising, lowering and tilting of said push frame while preventing sidewise movement of said implement relative to said tractor, comprising connecting members pivoted to said tractor and said implement on axes transverse to the center line of said tractor, for generally vertical movement only, and a universal connection between said connecting members a substantial distance forwardly of the connection between said push frame and said tractor, said connecting members being freely movable vertically upon raising and lowering said implement.

3. The combination with a tractor having a main frame, of a push frame extending longitudinally of said tractor beneath the main frame, means disposed rearwardly of said tractor and on substantially the center line thereof providing a universal connection between said main frame and the rear end of said push frame, an implement carried forwardly of said tractor on the forward end of said push frame, means on said tractor for selectively raising, lowering and laterally tilting said implement, and stabilizing means interconnecting a forward portion of said main frame and said implement for permitting raising, lowering and tilting of said push frame while preventing sidewise movement of said implement relative to said tractor, comprising a pair of substantially triangular stabilizing members having a universal connection between the apices thereof adjacent the forward portion of said tractor, said members having the sides thereof opposite said apices pivoted at spaced points to said tractor and said implement on axes transverse to the center line of said tractor for preventing lateral movement of said stabilizing members with respect to said tractor and implement.

4. The combination with a tractor having a main frame, of a push frame extending longitudinally of said tractor beneath the main frame, means disposed rearwardly of said tractor and on substantially the center line thereof providing a universal connection between said main frame and the rear end of said push frame, an implement carried forwardly of said tractor on the forward end of said push frame, means on said tractor for selectively raising, lowering and laterally tilting said implement, and stabilizing means interconnecting a forward portion of said main frame and said implement for permitting raising, lowering and tilting of said push frame while preventing sidewise movement of said implement relative to said tractor, comprising a pair of substantially triangular stabilizing members having a universal connection between the apices thereof on substantially the center line of said tractor, said members having the sides thereof opposite said apieces pivoted at spaced points to said tractor and said implement on axes transverse to the center line of said tractor for preventing lateral movement of said members on said tractor and implement.

5. The combination with a tractor and an implement carrying push frame supported on said tractor by a single universal connection toward the rear of said tractor and freely movable about said connection to permit substantial movement of said implement generally vertically, transversely and rotationally, of stabilizing means interconnecting said tractor and push frame comprising a pair of levers, means pivotally connecting one of said levers to a forward portion of said tractor about a transverse axis while preventing transverse movement thereof with respect to said tractor, means pivotally connecting said second lever to said implement about a transverse axis while preventing transverse movement thereof with respect to said implement, and a universal connection between said levers spaced longitudinally forwardly from the connection between said first lever and said tractor a substantial distance, whereby said stabilizing means permits raising, lowering and tilting while preventing sideways movement of said implement relative to said tractor.

6. The combination with a tractor and an implement carrying push frame supported on said tractor by a single universal connection toward the rear of said tractor and freely movable about said connection to permit substantial movement of said implement generally vertically, transversely and rotationally, of stabilizing means interconnecting said tractor and push frame comprising a pair of levers, means pivotally connecting one of said levers to a forward portion of said tractor about a transverse axis while preventing transverse movement thereof with respect to said tractor, means pivotally connecting said second lever to said implement about a transverse axis while preventing transverse movement thereof with respect to said implement, and a universal connection between said levers aligned with said first universal connection substantially longitudinally of said tractor, the distance from said second universal connection to the forward end of said push frame being substantially less than the distance from said first universal connection to the forward end of said push frame whereby said stabilizing means substantially prevents transverse movement of said push frame with respect to said tractor, while permitting raising, lowering and tilting thereof.

7. The combination with a tractor and an implement carrying push frame supported on said tractor by a single universal connection toward the rear of said tractor and freely movable about said connection to permit substantial movement of said implement generally vertically, transversely and rotationally, said universal connection being substantially on the center line of said tractor, of stabilizing means interconnecting said tractor and push frame comprising a pair of levers, means pivotally connecting one of said levers to the forward portion of said tractor about a transverse axis while preventing transverse movement thereof with respect to said tractor, means connecting said second lever to said implement about a transverse axis while preventing transverse movement thereof with respect to said implement, and a universal connection between said levers disposed on the longitudinal center line of said tractor and spaced longitudinally forwardly from the connection between said first lever and said tractor whereby said stabilizing means permits raising, lowering and tilting of said end of said push frame while preventing sideways movement of said implement relative to said tractor.

8. The combination with a tractor of a push frame extending longitudinally of and beneath said tractor, means disposed rearwardly of said tractor providing a universal connection between said tractor and the rear end of said push frame to permit substantial movement of the forward end of said push frame generally vertically, transversely and rotationally, an implement carried forwardly of said tractor on the front end of said push frame, means on said tractor for selectively raising, lowering and laterally tilting said implement and stabilizing means interconnecting a forward portion of said main frame and said implement for permitting raising, lowering and tilting of said push frame while preventing a sideways movement of said implement relative to said tractor, comprising a pair of connecting members, means pivotally connecting one of said members to said implement about a transverse axis while preventing transverse movement thereof with respect to said implement, means pivotally connecting said second connecting member to a forward portion of said tractor while preventing transverse movement thereof with respect to said tractor, said connecting members having their free ends universally connected together a substantial distance forwardly of the universal connection between the rear end of said push frame and said tractor.

HARVEY W. ROCKWELL.

REFERENCES CITED

The following references are of record in the file of this patent:

UNITED STATES PATENTS

| Number | Name | Date |
| --- | --- | --- |
| D. 143,353 | Rockwell | Dec. 25, 1945 |
| 1,522,378 | McLeod | Jan. 6, 1925 |
| 1,713,030 | Cummings | May 14, 1929 |
| 1,758,491 | Aitken | May 13, 1930 |
| 1,997,001 | Lamb | Apr. 9, 1935 |
| 2,171,031 | Graham et al. | Aug. 29, 1939 |
| 2,173,158 | Corbett | Sept. 19, 1939 |
| 2,269,775 | Le Bleu | Jan. 13, 1942 |
| 2,311,553 | Le Tourneau | Feb. 16, 1943 |
| 2,356,600 | Lentz | Aug. 22, 1944 |